(12) United States Patent  
Ferlitsch

(10) Patent No.: US 7,551,299 B2
(45) Date of Patent: Jun. 23, 2009

(54) METHOD AND APPARATUS FOR HANDLING DIFFERENT PRINT DATA FORMATS

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 907 days.

(21) Appl. No.: 10/909,221

(22) Filed: Jul. 29, 2004

(65) Prior Publication Data

US 2006/0023239 A1    Feb. 2, 2006

(51) Int. Cl.
*G06F 3/12* (2006.01)
*H04N 1/40* (2006.01)

(52) U.S. Cl. .................. 358/1.13; 358/2.1; 358/462

(58) Field of Classification Search .............. 358/1.9, 358/2.1, 462, 518, 534, 3.06; 382/164, 173, 382/176, 229
See application file for complete search history.

(56) References Cited

U.S. PATENT DOCUMENTS

| 5,706,410 | A | | 1/1998 | Bagley et al. ............... 395/112 |
| 5,767,978 | A | * | 6/1998 | Revankar et al. ............ 358/296 |
| 5,960,113 | A | * | 9/1999 | Even et al. ................... 382/229 |
| 5,960,166 | A | | 9/1999 | Brown, III et al. ........... 395/114 |
| 6,459,498 | B2 | * | 10/2002 | Miyake et al. .............. 358/1.15 |
| 6,490,055 | B1 | | 12/2002 | Shimizu ..................... 358/1.9 |
| 6,819,439 | B2 | * | 11/2004 | Hayashi et al. ............. 358/1.13 |
| 7,262,876 | B2 | * | 8/2007 | Wei et al. .................... 358/1.15 |
| 2002/0060801 | A1 | * | 5/2002 | Motamed et al. ........... 358/1.13 |
| 2002/0097418 | A1 | | 7/2002 | Chang et al. ................ 358/1.13 |
| 2004/0218202 | A1 | * | 11/2004 | Josephsen et al. .......... 358/1.13 |
| 2005/0007632 | A1 | * | 1/2005 | Miyazaki et al. ........... 358/1.18 |
| 2005/0036173 | A1 | * | 2/2005 | Hayashi et al. .............. 358/2.1 |
| 2005/0052700 | A1 | * | 3/2005 | Mackenzie et al. ......... 358/1.18 |
| 2005/0088697 | A1 | * | 4/2005 | Yasutomi et al. ............. 358/2.1 |

* cited by examiner

*Primary Examiner*—Twyler L Haskins
*Assistant Examiner*—Dennis Dicker
(74) *Attorney, Agent, or Firm*—Stolowitz Ford Cowger LLP

(57) ABSTRACT

A printing system operates multiple different printing pipeline stages that together convert raster formatted print data or image formatted print data into a printer swath. The raster formatted print data or image formatted print data is received at the different printing pipeline stages according to the print data's level of rasterization. This allows the rasterization stages that have already been performed on the print data to be skipped. In another aspect of the printing system, the controller identifies job or page settings in the raster or image print data and uses the identified job setting in the different pipeline stages to rasterize the print data.

16 Claims, 7 Drawing Sheets

METHOD AND APPARATUS FOR HANDLING DIFFERENT PRINT DATA FORMATS

BACKGROUND

A user has a large variety of imaging format choices for printing an image. For example, Page Description Language (PDL), Raster, RAW Raster, Image data, PDL encapsulated image data, mix PDL/Raster. These different formats have different effects on the performance of the host computer and printing device. Modern Multi-Function Peripherals (MFPs) are either not designed to handle a wide mix of imaging formats, or not designed to handle them in the most performance effective manner.

FIG. 1a shows one type of printing scheme, commonly referred to as a dumb printer. The dumb printer only takes pure raster data 12 (i.e., no job control), and passes the raster data 12 straight to a marking engine 14 for printing. In this printing device, a printer driver must convert the application print data (print job) into the raster format 12 specific to the marking engine 14 for the printing device (i.e., printer swath). Thus, the printer driver performs all of the function of converting the application data to the final marking instructions such as Raster Image Processor (RIP) for the marking engine 14.

FIG. 1b shows a slightly more improved printer version sometimes referred to as a raster printer. In this printing version, the printing device has some limited print control for handling raster data with embedded job control commands 16. In this printing device, a printer driver converts the application data into a raster format specific to the marking engine 14 and embeds job control sequences with the raster data for user specified printing options (e.g., number of copies, duplex printing, etc.). The raster data with the job control sequences 16 is generally in proprietary formats and is initially processed by a job control interpreter 18. The job control interpreter 18 analyzes the print data stream 16 to extract the job control sequences from the raster data. The raster data (i.e., printer swath) is passed to the marking engine 14 for outputting. Raster data printing is then controlled by the job settings (e.g., duplex) 20 extracted from the print job 16 and by any default settings 22 set on the printing device.

FIG. 1c shows another type of modern printing device, commonly referred to as a PDL printer. The PDL printer accepts a print job in the form of a Page Description Language (PDL), such as Print Control Language (PCL), Postscript or Portable Document Format (PDF). The PDL data may also be optionally combined with job control data, such as Printer Job Language (PJL) and represents a high level description of the output, which must then be processed by the printer device into raster data (i.e., RIP).

In this case, the printer driver performs a limited amount of work to convert the application data into PDL data, and performs little to no image processing. The print controller in the printing device performs the PDL interpretation, image processing and rasterization (RIP). The PDL data may also be preceded by a job control sequence (e.g., PJL), which specifies job wide settings, such as copy count, paper sources, output bins, pagination (e.g., booklet, n-up), duplex printing and finishing (e.g., stapling, hole punch).

The Integrated Printer System (IPS) 5.02 firmware code from OAK Technologies, Wolburn, Mass. demonstrates a system for handling PJL/PDL jobs in a print controller. At the top level, a print data stream 24 is analyzed by a sniffer process 26. This process analyzes some initial number of bytes in the print data stream 24 to automatically determine the language type. If the sniffer 26 determines the input 24 is PDL (e.g., PS, PCL, PDF), the sniffer 26 passes the print job to a PDL interpreter 30. The PDL interpreter 30, as described above, performs the entire function of converting the print data 24 into the device specific raster data (i.e., printer swath) 32 which is sent to the marking engine 34. The PDL formatted print data 27 may contain job and page settings, which further control the rendering, marking, outputting and finishing of the job.

If the sniffer 26 determines the input is PJL, the print job 24 is passed to the PJL interpreter 28. The PJL interpreter 28 processes the PJL data 29 until either all the data is consumed (i.e., non-output job) or an explicit language switch command is encountered (i.e., @PJL ENTER LANGUAGE=<language>). The PJL interpreter 28 then passes the remaining print data stream that follows the explicit language switch command to the PDL interpreter 30 specified in the language switch command. The PDL interpreter 30 then performs the functions described above to eventually output the raster data 32. Additionally, the PJL interpreter 28 may output job settings 36, which further control the rendering, marking, outputting and finishing of the job. The printing device may also include default settings 38 that are combined with the job settings 36 output by the PJL interpreter 28 and PDL interpreter 30.

FIG. 1d shows a printing device that uses an IPS code with modifications that allow the supported input imaging formats to include TIFF, which is an image data format. In this device, the sniffer 40 performs the same function for PDL and PJL/PDL data as described above. If the sniffer 40 determines that the input print data 42 is TIFF, then the TIFF data is passed directly to a Tagged Image File Format (TIFF) imaging processing pipeline 44 that bypasses the PDL interpreter 46 and PJL interpreter 45. Because the image format 43 is close to the final format used by the marking engine 48 (i.e., printer swath), the TIFF image processing pipeline 44 is more efficient than the PDL pipeline that includes the PJL interpreter 45 and the PDL interpreter 46. For example, the imaging pipeline 44 can generally drive the marking engine 48 at the rated full engine speed, regardless of the complexity of the TIFF image 43.

This system still has several drawbacks. First, many of the imaging processing steps performed in the TIFF processing pipeline 44 are identical to processes in the PDL pipeline 46. Thus, the same printing processes are re-implemented in both the PDL and TIFF pipelines. Second, the TIFF pipeline 44 does not support specifying job control settings (e.g., PJL) and thus acts as a dumb printer for TIFF data.

Therefore, there is a need for an even more effective technique for supporting a wide variety of imaging formats.

SUMMARY OF THE INVENTION

A printing system operates multiple different printing pipeline stages that together convert raster formatted print data or image formatted print data into a printer swath. The raster formatted print data or image formatted print data is received at the different printing pipeline stages according to the print data's level of rasterization. This allows the rasterization stages that have already been performed on the print data to be skipped. In another aspect of the printing system, the controller identifies job or page settings in the raster or image print data and uses the identified job setting in the different pipeline stages to rasterize the print data.

The foregoing and other objects, features and advantages of the invention will become more readily apparent from the following detailed description of a preferred embodiment of the invention which proceeds with reference to the accompanying drawings.

DETAILED DESCRIPTION

A rasterization pipeline in a printer controller is decomposed into distinct phases or stages. For example, the rasterization pipeline may be decomposed into decoding, rotation/resizing, image enhancement, color conversion, and half-toning stages. An improved pipeline architecture supports entry into any of these pipeline stages directly from a top-level sniffer (i.e., image/raster formats), PJL interpreter (i.e., PJL wrapped image/raster data) or PDL interpreter (i.e., PDL encapsulated image/raster data). This is referred to as a multi-entry point rasterization pipeline. The multi-entry point pipeline architecture allows processing tradeoffs between a host system and a printing device anywhere in the rasterization pipeline. The rasterization pipeline is alternatively referred to as a raster/image imaging pipeline since both raster formatted print data and image formatted print data can both be processed.

The printer controller accepts imaging data that has been partially rasterized up to any of the rasterization pipeline stages. Efficiency is achieved by recognizing which stage imaging data has been partially rasterized, for example, by a host. The printer controller then bypasses the completed rasterization stages and enters the rasterization pipeline at the next sequential stage.

This printer system is more effective since rasterized data (e.g., RAW raster) can be processed in a wider variety of formats, including encapsulating within a Page Description Language (PDL), mixed with PDL data, encoded into an image format, and wrapped within a PJL header. Imaging data of various stages of rasterization (e.g., per page, per band, per drawing element) may also be intermixed in the same job.

Figure 1A:
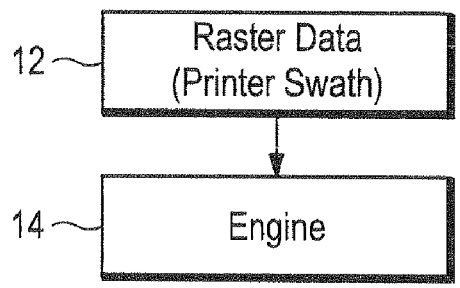
FIG. 1a is a print control architecture that processes only raw raster print data.
Figure 1B:
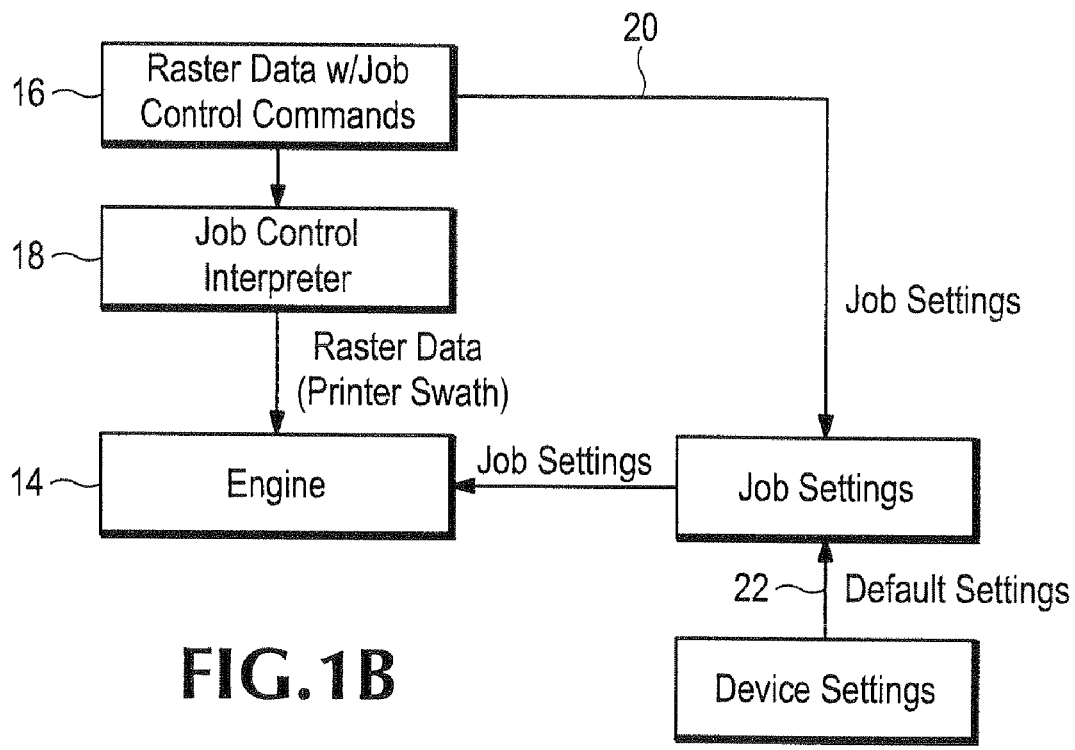
FIG. 1b is a print control architecture that processes raster data with embedded job controls.
Figure 1C:
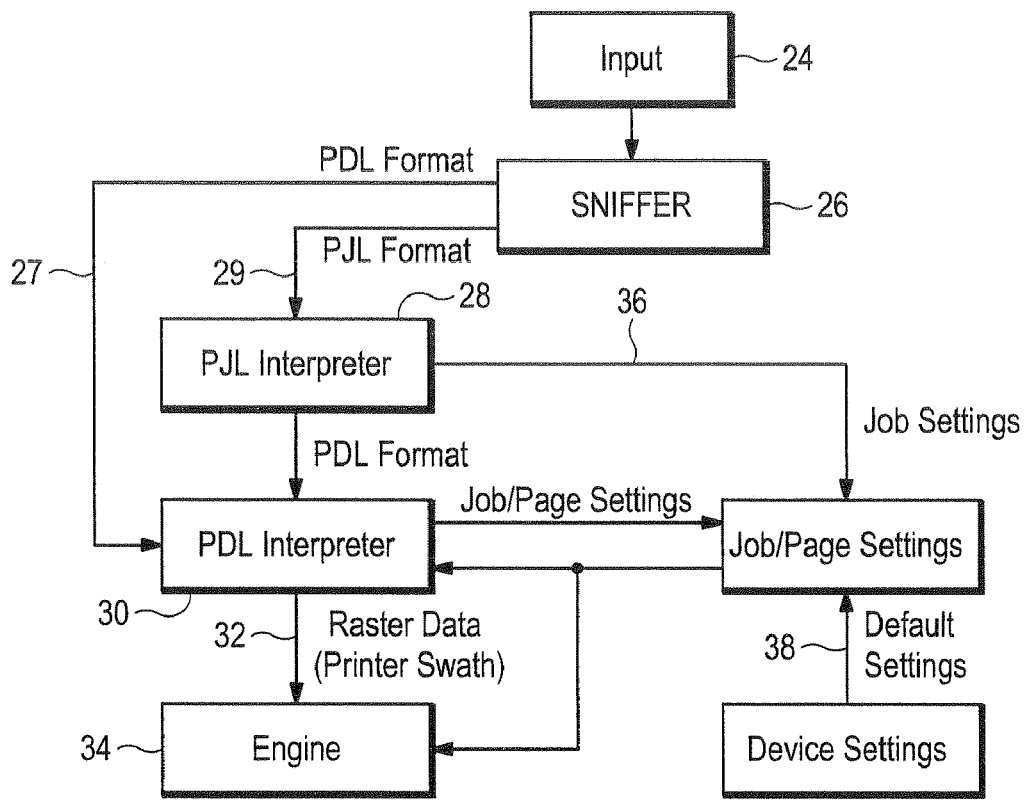
FIG. 1c is a print control architecture that processes PDL or PJL wrapped print data.
Figure 1D:
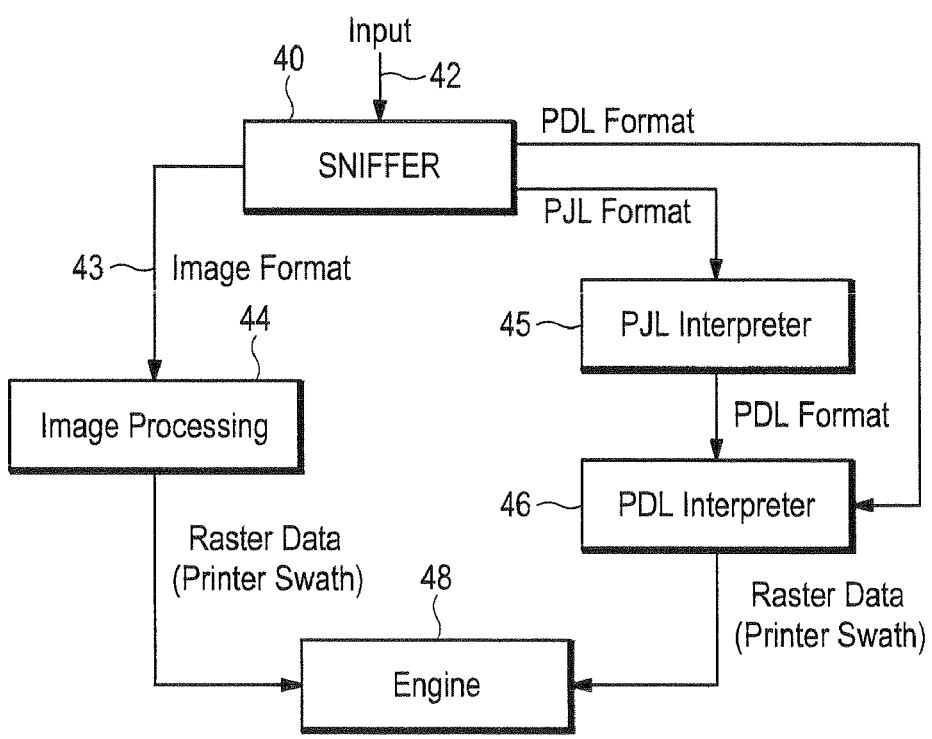
FIG. 1d is a print control architecture that processes image print data and PDL or PJL wrapped print data.
Figure 2:
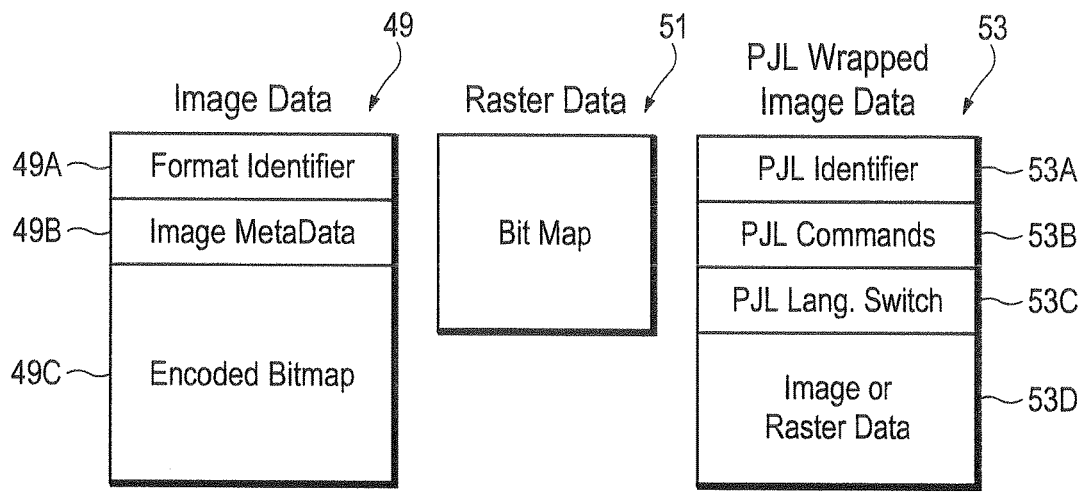
FIG. 2 is a block diagram showing different print data formats that can be processed by a multi-entry rasterization pipeline.

Another advantage is the support of two non-traditional imaging formats, herein referred to as RAW raster and mix PDL/Raster. FIG. 2 shows examples of different imaging formats. An image data format 49, such as TIFF, JFIF and BMP, is shown for a single image. The image print data 49 consists of three primary components:

1. Format specifier 49A. A byte sequence, typically the first few bytes that uniquely identify the image file format and possibly byte related issues, such as byte order.
2. Image Metadata 49B. A text or binary section or records which describe information about the image, such as the location of the image data, color space, and the decoding method.
3. Encoded bitmap 49C. A raw bitmap which has been encoded, such as broken down into strips per color plane, and each strip is run-length compressed.

The layouts of image data 49 for multiple images include image metadata and encoded bitmaps linked together in a link list, or have a cross reference table such as an image table of contents.

The layout for RAW raster data 51 refers to any raster format (i.e., bitmap) that has not been fully Raster Image Processed (RIP) for the printing device. A raw bitmap is a sequence of rows or columns representing an image as one or more color planes. Examples of raster image processing include color space conversion, image enhancement, rotation/resizing, and half-toning.

A mix PDL/Raster 53 refers to any format where some of the page data is specified by PDL commands and some of the page data is specified as a raster image. The PJL wrapped image data typically consists of four primary components.

1. PJL identifier 53A. A byte sequence that uniquely identifies the following byte sequence as a PJL commands sequence.
2. PJL commands 53B. A PJL command sequence which generally is used to set job wide print options (e.g., duplex, stapling).
3. PJL language switch 53C. A PJL command which identifies the print data format for the byte sequence that follows the command.
4. Image or raster data 53D. The image or raster data to be printed.

Traditionally, the print data is specified either as a PDL with the processing done wholly on the printing device, or as a printer swath with processing done wholly on the host. With the multi-entry pipeline format, processing can be distributed on both the host and device for any of the print formats described above. A user also has control of job-wide and page-specific settings for raster/image using PJL, PDL, metadata (e.g., TIFF IFD) and the front panel (e.g., such as when input is from a memory stick).

Traditionally, raster printer drivers had to be written for each printer model, since the output of the printer driver (i.e., printer swath) is specific to the printer's marking engine. The multi-entry pipeline architecture allows a generic RAW raster driver to be written that produces a device independent raster output (e.g., bitmap image in sRGB space) that supports a large variety of printer models. Further, the printer driver can be performance tuned to obtain the optimal division of raster image processing between the host and the printing device. This performance tuning can also be dynamically changed during the print job.

The print system also supports direct printing of image formats. Traditionally, only image formats already supported by the printing device can be printed directly (i.e., direct submission without conversion to a PDL). The decoding process can be performed on the host to extract the bitmap data which is then passed to the printing device as a RAW raster input. This allows new image formats to be supported without having to update firmware.

Language (PJL/PDL), Image and Raster Switching Flow

Figure 3:
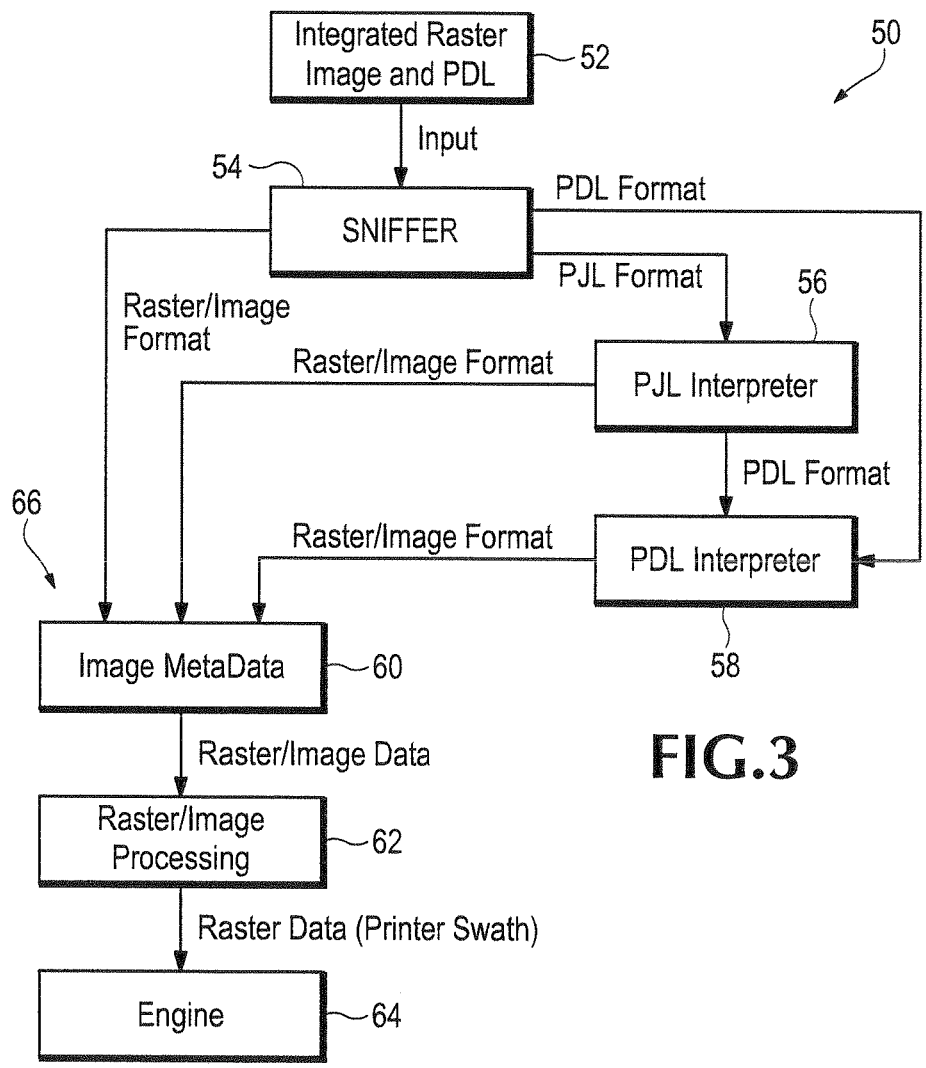
FIG. 3 shows the switching flows used in the multi-entry rasterization pipeline.

FIG. 3 shows a block diagram of a switching flow. A controller in a printing device 50 can take as print job input 52 (e.g., print stream) a wide variety of imaging formats, including:

1. Printer job control languages, such as PJL.
2. Page description languages (PDL) such as Print Control Language (PCL), Postscript (PS), and Portable Document Format (PDF).
3. Printer swath (i.e., post-RIP).
4. Image formats such as TIFF and JFIF.
5. PJL wrapped image/raster data.
6. PDL encapsulated image/raster data.
7. RAW raster (i.e., not fully RIP'd).
8. mix PDL/Raster Of course, other types of imaging formats can also be used. The printer 50 processes a mixed format input consisting of any combination of PJL, PDL, image and raster formats. The initial imaging format switching is handled by a sniffer process 54. Subsequent imaging format switching is handled by an explicit language switch. Alternately, subsequent image format switching may be handled by resubmission to the sniffer process 54.

The print job or imaging input stream (e.g., print stream) 52 is analyzed by the sniffer process 54. The sniffer 54 samples (i.e., reads but does not discard pokes) some number of initial bytes in the imaging stream 52 to determine the input format. The formats in this example are grouped into three categories: PJL, PDL, and Image/Raster.

If the imaging stream 52 is a PJL format, the imaging stream 52 is passed to a corresponding PJL interpreter 56. In the description below PJL is used as an example of a job control language. However, the printing system is not limited to using PJL and job control languages, other than PJL, can also be used. If the imaging stream 52 has a PDL format, the imaging stream 52 is passed to a corresponding PDL interpreter (e.g., PCL5, PCL XL, Postscript, PDF) 58. If the imaging stream 52 is initially a raster or image format, the imaging stream is passed to the rasterization pipeline 66. One example of the rasterization pipeline 66 includes image metadata processing 60 and raster/image processing 62.

If the PJL interpreter 56 encounters an explicit language switch (e.g., @PJL ENTER LANGUAGE=<format>) or a command directive for an automatic language switch (e.g., @PJL ENTER LANGUAGE=AUTO), an imaging format switch occurs. If the explicit or automatic language switch is to a PDL format, the remaining imaging stream 52 is passed to the corresponding PDL interpreter 58 (e.g., PCL5, PCL XL, Postscript, PDF). If the explicit or automatic language switch is to a raster/image format (e.g., PJL wrapped raster/image data), the remaining imaging stream 52 is passed to the raster/image pipeline 66.

If the PDL interpreter 58 encounters an explicit or automatic language switch, an imaging format switch occurs. If the explicit or automatic language switch is a raster/image format (e.g., PDL encapsulated raster/image data or mix PDL/Raster) the subsequent raster/image formatted data is passed to the raster/image pipeline 66. The PDL interpreter 58 then continues to process to the next page description command (e.g., new page or new drawing element).

When raster/image formatted data is passed to the raster/image pipeline 66, the data is first analyzed by the image metadata process 60. The image metadata process 60 performs two functions:

1. Interpret any encoding:
   a. Proprietary encoding (e.g., job/page control commands).
   b. Interpret any industry standard encoding (e.g., encryption, digital rights management), such as in a TIFF image file directory (IFD) entry.
2. Determine the format (i.e., degree of RIP processing) of the raster/image and route the raster/image data to the corresponding entry point in the multiple-entry point raster/image imaging pipeline.

The multi-point raster/image pipeline 66 then completes the raster/image processing 62 that converts the print data into the final printer swath (i.e., inking instructions specific to the marking engine 64). In the raster/image processing 62, the printer swath segments are managed appropriately for eventual passing to the marking engine 64. If the printer swath segments are page segments, the printer swath segments are generally compressed and placed in a post-RIP queue, awaiting transmission to the marking engine 64. If the printer swath are page element segments, the printer swath segments are generally held until coalesced with the remaining page element segments, at which point the coalesced printer swath is a page segment.

Sniffers are generally known to those skilled in the art and is therefore not described in further detail. For example, sniffers are described in Oak Technologies Integrated Print Subsystem (IPS) 6.0 which is herein incorporated by reference. The operation of PDL and PJL interpreters are also generally known to those skilled in the art and is described in the following references which are herein incorporated by reference. HP PCL/PJL Reference, Printer Job Language Technical Reference, $11^{th}$ Edition (1999); HP PCL Printer Language Technical Reference Manual, $1^{st}$ Edition (1992); Adobe Postscript® Language Reference Manual, $2^{nd}$ Edition; Adobe PDF Reference Manual v1.4, $3^{rd}$ Edition. Image Data Formats are also known to those skilled in the art and are described for example, in TIFF Revision 6, June 1992, Adobe Systems which is also herein incorporated by reference.

Job Settings

Figure 4:
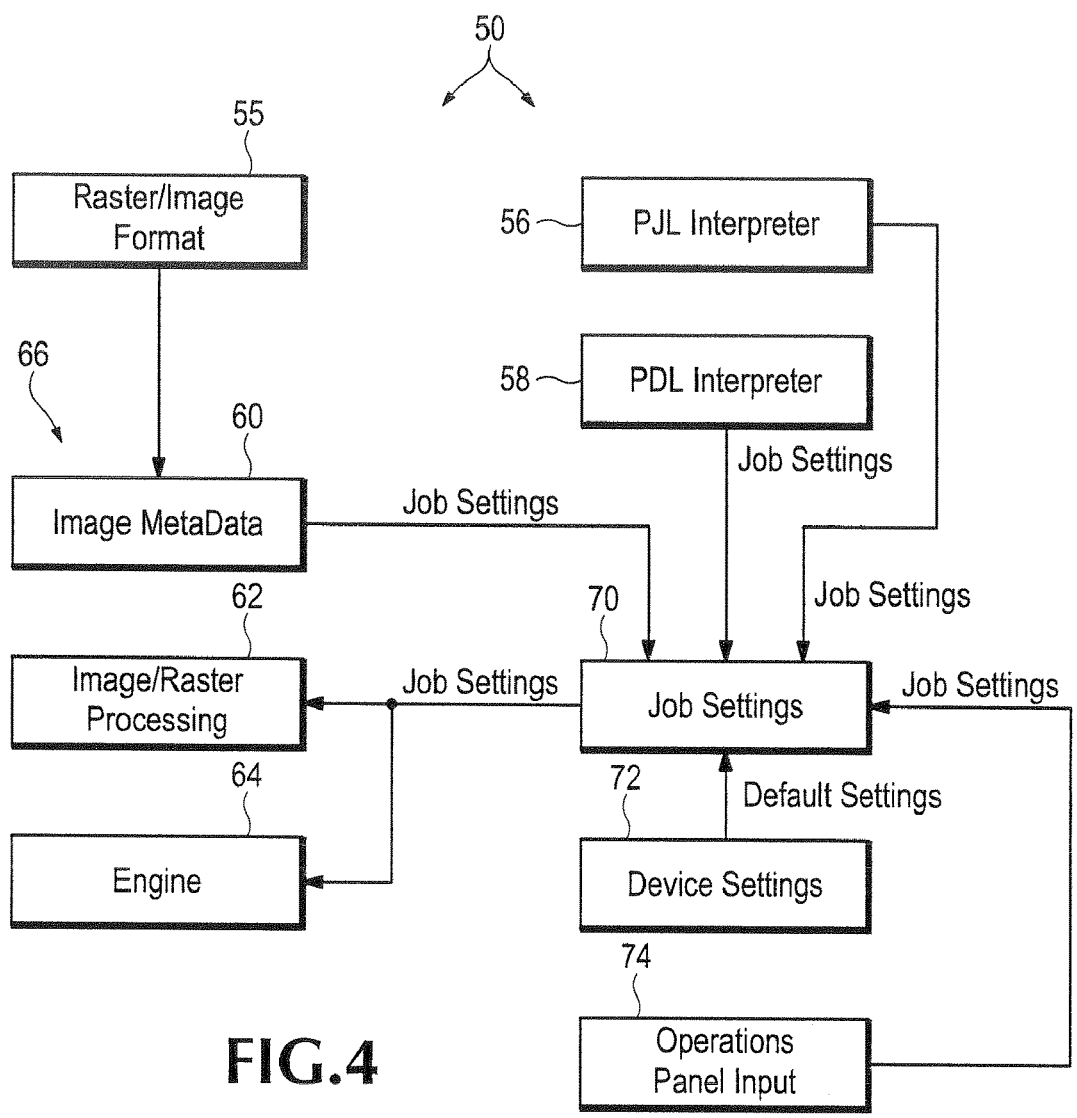
FIG. 4 is a block diagram showing how job settings are extracted from different formatted print data.

FIG. 4 is an example of how job-wide settings 70 may be specified in the printing device 50. The job settings 70 may be specified through any combination of the PJL interpreter 56, PDL interpreter 58, the image metadata process 60, a control panel input 74 or an embedded device web page (not shown).

Initially, the job settings 70 for the imaging stream 52 (FIG. 3) are set to printing device default settings 72. If the initial imaging format of the imaging stream 52 (FIG. 3) is PJL, the job settings may be modified or supplemented by the PJL interpreter 56. If the initial or subsequent imaging format of the imaging stream 52 is PDL, the job settings 70 may be further modified or supplemented by the PDL interpreter 58.

Of particular interest is the additional job settings that are generated by the image metadata process 60. The raster/image data 55 can also include information that can be considered a job setting. For example, in TIFF there is an orientation flag that indicates weather an image is portrait or alternative orientation. The image metadata process 60 interprets the encoding raster/image formatted print data 55 to look for information that is associated with a job setting. Any job settings detected in the raster/image data 55 are then used by the image metadata process 60 to modify or supplement the central group of job settings 70.

Generally, job wide or page specific settings are specified in image data using proprietary or industry standard tags in the metadata associated with a specific page image (i.e., page specific) or a collection of page images (i.e., job wide), such as implementing a proprietary extension of page grouping with common tag attributes using the common industry tree extension for TIFF.

The job settings 70 may be further modified by a user selecting an input on the printing device operations panel 74, such as when printing a digital image from a memory stick (e.g., direct digital camera input). The job-wide settings 70 then control the different operations in the raster/image (rasterization) pipeline 66, marking engine 64, collator and any other post-collator process (e.g., stapler, stacker, hole punch, post-fuser inserter, etc.).

This allows all the job wide capabilities of the printing device 50 to be operated regardless of the imaging format. For example, job-wide settings 70 may be specified for a raster/image format by wrapping the data with PJL, encapsulating the data within a PDL, using proprietary metadata embedded in the data, or entry at the operations panel 74, or input from embedded device web page (not shown).

Page Settings

Figure 5A:
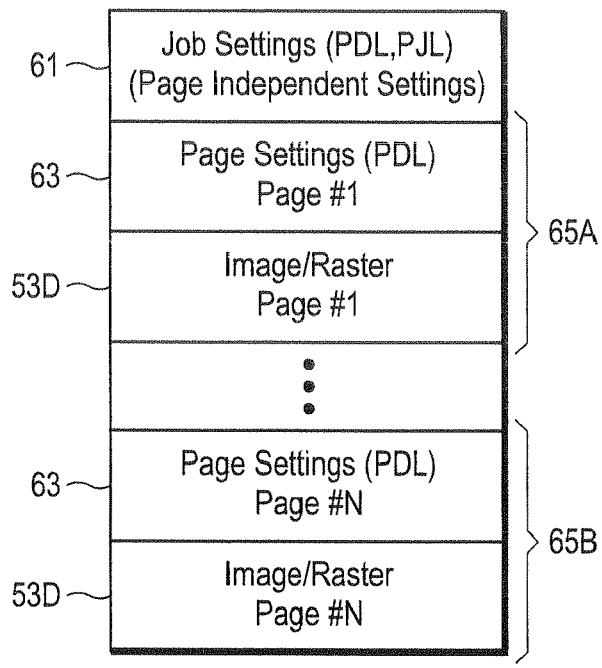
FIG. 5A is a block diagram of a print job with multiple pages.

Referring to FIG. 5A, the PDL specific page control commands, such as page orientation, paper size, margins, etc., can either be contained in job settings 61 that are page independent or in page settings 63 that are page dependent. Page independent commands and settings 61 apply to the current and subsequent pages 65 until overridden. These are alternatively referred to as page persistent commands. Page dependant commands and settings 63 apply only to a current page 65 and not to subsequent pages.

Figure 5B:
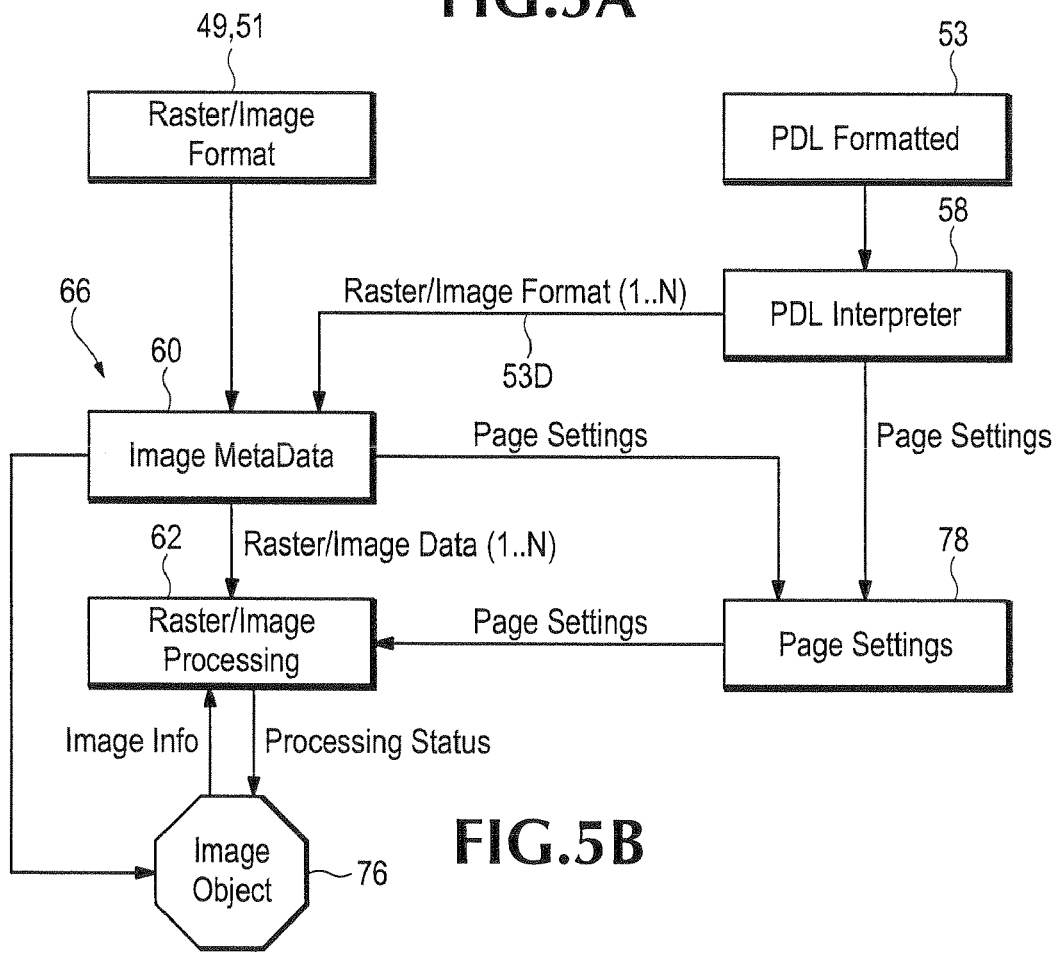
FIG. 5B is a block diagram showing how pages settings are extracted from the print job in FIG. 5A.

FIG. 5B shows how page-specific settings may be specified by the PDL interpreter 58 or the image metadata process 60. The page settings 78 for a first page 65A are set either to the PDL specific default page settings, when processing PDL data 53, or to default settings for raster/image data 49, 51 which is not PDL encapsulated. If the imaging stream is PDL formatted data 53, the page settings may be modified by the PDL interpreter 58 on a job bases according to job settings 61 or on a page by page basis according to page settings 63. For example, the job settings 61 are first identified and placed into global page settings 78. Then the existing page settings 78 may be modified or supplemented on a page by page basis with any other page settings 63 for the particular page 65 currently being processed.

If the imaging stream is a PDL encapsulated raster/image data 53, each raster/image page 53D for each page 65 is successively passed to the image metadata process 60. If the imaging stream is raster/image data 51 or 49, respectively (FIG. 2), the page settings 78 may be further modified by the image metadata process 60. The page settings 78 from the PDL interpreter 58 and the image metadata process 60 are combined with any job settings 70 generated in FIG. 4.

An image object 76 is generated when raster/image data is being processed by the raster/image pipeline 66. The image object 76 monitors and controls the raster/image pipeline 66 and directs each pipeline stage 76 to where to next move the image/raster data. For example, the image object 76 may apply a tag to the image/raster data that indicates where the raster data is currently located in the pipeline 66 and where the raster data needs to be sent after a current pipeline stage is completed.

Raster/Image Imaging Pipeline

Figure 6:
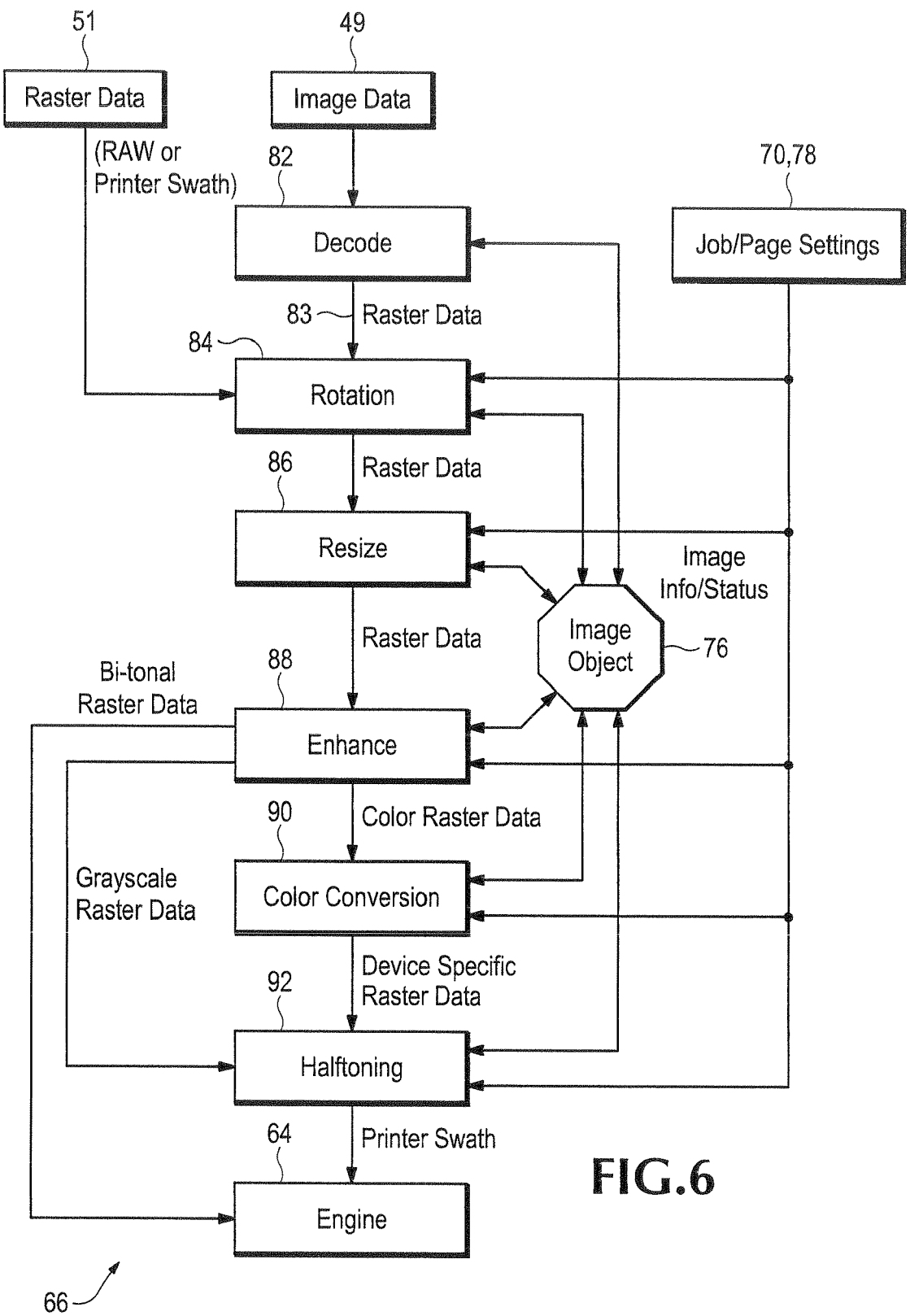
FIG. 6 is a block diagram showing one example of the multi-entry rasterization pipeline.

FIG. 6 shows how raster data 51 and image data 49 is processed by the multi-entry raster/image pipeline 66. The image metadata process 60 described above determines the entry point in the pipeline 66 for the raster/image data 49, 51, based on the format and attributes described in the metadata of the raster/image data (for example, see metadata 49B in FIG. 2). For example, the metadata may indicate that the input is a TIFF encoded bitmap and the metadata process 60 directs the input to the TIFF decoder entry point. The raster/image processing stages then process the raster/image data according to any received job settings 70 and page settings 78.

Note, metadata may also be specified by means other than embedding into the raster/image data. For example, metadata may be specified in a proprietary manner as part of a PJL or PDL command (see PJL commands 53B in FIG. 2). The metadata is then passed with the associated raster/image data to the image metadata process 60.

Image Data

If the raster/image data format is an image data format 49 (FIG. 2), such as TIFF, JFIF, Windows bitmap, etc., the image data 49 enters the raster/image pipeline 66 at a decoding stage 82. Dependent on the file format, compression method, and possibly other attributes, specified in the associated image object 76, the image data 49 is processed by the appropriate decoder in the decoding stage 82. The decoder stage 82 may perform some or all of the following functions:

1. Locates and extracts the raster data.
2. If compressed, decompresses the raster data.
3. Reorders any byte, band, tile or stripe (row or column) for compatibility with subsequent stages.

The raster data (RAW or printer swath) 83 is then passed to a rotation/resize stage 84.

RAW Raster

RAW raster data 51 provided as a direct input, or raster data 83 from the image decoder 82, enters the raster/image pipeline 66 at a rotation/resize stage 84. The raster data may be rotated in stage 84 and/or resized in stage 86 based on job or page attributes specified by the image object 76.

For example, the raster data may be rotated 90 degrees to the right in stage 84 and resized in stage 86 to maintain aspect ratio for a landscape page orientation setting. Other examples of resizing include: fit-to-page, n-up printing and booklet imposition.

The rotated/resized raster data re-enters the raster/image pipeline 66 at an image enhancement stage 88. In enhancement stage 88, the raster data may be enhanced based on job or page attributes specified in the image object 76 as described above in FIGS. 4 and 5. For example, if the raster data originated as image data with JPEG compression, the image enhancement stage 88 may attempt to remove artifacts (e.g., geometric anomalies) introduced by a lossy compression method, such as JPEG.

Other examples of enhancement stage 88 include: adjusting the image quality according to an ink preservation mode (e.g., draft printing) or an adjustment to an output resolution different than the original resolution. Another example of the enhancement stage 88 includes analysis of the raster data, either by segmentation or pre-located information in the image object 76 (e.g., such as determined by a PDL interpreter or annotated raster data), to separate line art from graphic art. The line art and graphic art may then be processed differently. For example, during a resolution reduction operation, thin line edges may become fragmented. The enhancement stage could use the identified line art to detect and correct fragmented lines after resolution reduction.

The output from the image enhancement stage 88 re-enters the raster/image pipeline 66 either at the color conversion stage 90, a half-toning stage 92, or is passed onto the marking engine 64. The raster data re-enters the pipeline according to the raster data format and attributes specified in the associated image object 76.

Color Raster Data

Color raster data may be output from the image enhancement stage 88 re-entering at the color conversion process 90. If not already converted, the color conversion stage 90 converts the color space of the raster data into the color space for the printing device. For example, the color space of the raster data may be a source reference color space such as sRGB. The final color space conversion may result in a CMY or CMYK color space of the printing device. Of course, this example uses a 4 color ink/toner. For printers with more than 4 inks, there are additional color planes.

Once the color raster data is converted to the device's color space, the raster image data may be further processed for under color removal (UCR) or otherwise called K-substitution. In this process, some or all composite black (combination of CMY) is converted to the device's equivalent black (K). This process is generally used either to conserve color ink by substituting black ink or to enhance the edges of black line art. The output from the color conversion process 90 re-enters the raster/image pipeline 66 at a half-toning stage 92.

Device Specific Color Raster Data

Device specific color raster data from the image enhancement stage 88 re-enters the raster/image imaging pipeline 66 at the half-toning stage 92. In half-toning stage 92, each color plane (e.g., C, M, Y and K) is half-toned into bi-tonal data to simulate a contone (i.e., continuous tone) when perceived by the human eye, where each dot represents either on/off of a drop of the corresponding ink. The output from the half-toning stage 92 is passed onto the marking engine 64.

Grayscale Raster Data

Gray scale images may also be produced using dots of a single shade but varying size to simulate the different shades of grey. Laser printers that cannot print different sized dots, halftones are produced by varying the numbers of dots in a given area.

Grayscale raster data output from the image enhancement stage 88 re-enters the raster/image pipeline 66 at the half-toning stage 92. In this half-tone stage 92, the grayscale data is half-toned into bi-tonal data to simulate to a gray shade when perceived by the human eye, where each dot represents either on/off of a drop of black ink. The output from the half-toning stage 92 is passed onto the marking engine 64.

Bi-tonal Raster Data (Printer Swath)

Bi-tonal raster data (i.e., printer swath) output from the image enhancement stage 88 is passed directly to the marking engine 64.

Color Conversion

Figure 7:
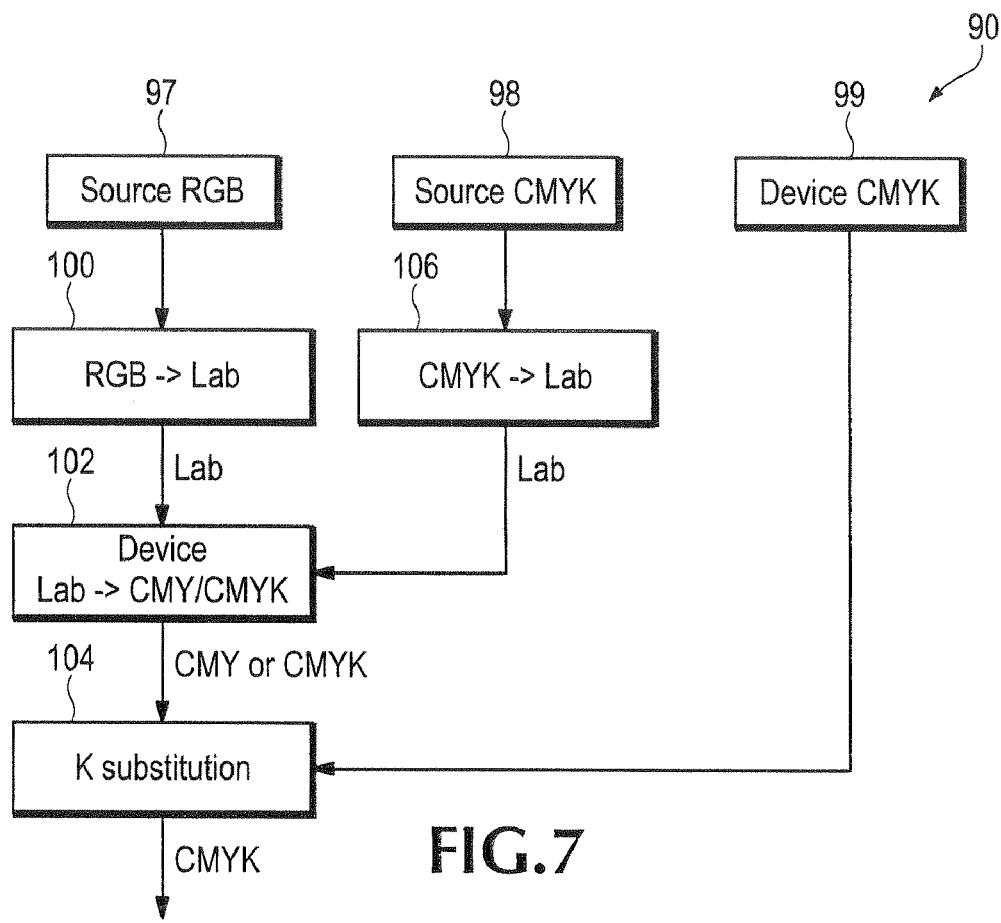
FIG. 7 is a block diagram of a raster color conversion scheme.

FIG. 7 shows one example of the color conversion stage 90 for various source color input spaces. However, other color conversion processes can also be used. In this example, the color input spaces may be:

1. Device Independent RGB 97 (e.g., sRGB)
2. Device Independent CMY[K] 98 (e.g., defined for a known press process)
3. Device Specific CMY[K] 99 (i.e., defined for a specific printing device)

If the input space is device independent RGB 97 or device independent CMYK 98, process 100 or process 106, respectively, convert the input space into CIE color space, such as Lab or XYZ, based on a color space profile of the input space (e.g., sRGB). The intermediate color space (e.g., Lab or XYZ) is then converted in process 102 to the device specific CMY[K] space, based on a color space profile of the printing device.

If the input space is device specific CMYK 99, then the above process is bypassed. The device specific CMY[K] may optionally be processed for Under Color Removal (UCR) in process 104, also known as K-substitution, to convert some or all composite black (i.e., gray shade combinations of CMY) into pure black (i.e., K). Thus, different color conversion stages can also have multiple entry points depending upon the type or source color data.

Figure 8:
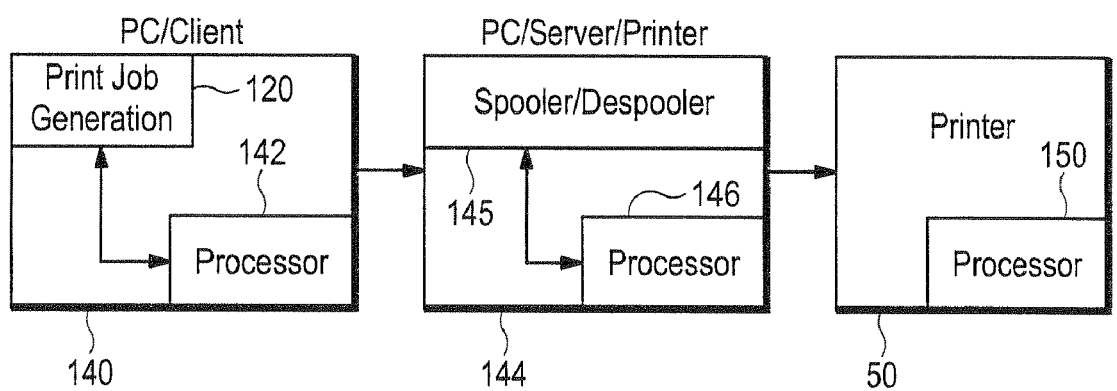
FIG. 8 is a block diagram of a printing system used for implementing the printer processing shown in FIGS. 2-7.

FIG. 8 shows an example of a printing system that implements the printing operations described above. A print job generation process 120 is generally performed in a Personal Computer (PC) or other computing device alternatively referred to as a client or host 140. The client 140 has a processor 142 that runs application software and a printer driver 120 that generates the print job.

The print job is then generally sent to a spooler/despooler operation 145 that in one embodiment is software that runs on a processor 146. The spooler/despooler operation 145 can be conducted in the client 140, in a separate server 144, or in the printer device 50. In other printer systems the spooler/despooler operation 145 may be distributed among multiple different connected computing devices. A spooler function manages the print jobs by creating a print job queue and then deciding when to hand off the print jobs to one or more printers 148. A despooling function then delivers the print jobs and confirms that the print jobs are successfully printed.

The printer device 50 has a processor or controller 150 that conducts the raster/image pipeline 66 operations described above in FIGS. 3-7. In an alternative embodiment, the raster/image pipeline 66 and print job interpreters 54, 56 and 58 (FIG. 3) are implemented in software that is run by different combinations of the processors in devices 140, 144 and 50. In yet other embodiments, raster/image pipeline 66 and print job interpreters 54, 56 and 58 are run in different combinations of the client 120, server 145 and printer 148 according to the resource availability, and possibly other factors.

Other embodiments include other imaging operations such as print, fax, scan, copy and document management, such as document archive/retrieval, manipulation and transfer.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for processing print data, comprising:
   operating a rasterization pipeline comprising multiple different rasterization pipeline stages for converting raster formatted print data or image formatted print data into a printer swath;
   selecting one of the pipeline stages as an entry point into the pipeline for the received print data according to a level of rasterization of the received print data; and
   receiving the raster formatted print data or image formatted print data at the selected pipeline stage entry point;
   generating an image object for monitoring and controlling the multiple-stage rasterization pipeline during processing of the raster formatted or image formatted print data;
   sending the raster formatted print data generated in the rasterization pipeline to a color enhancement stage in the rasterization pipeline;
   sending color raster data output from the enhancement stage to a color conversion stage in the rasterization pipeline;
   sending grayscale raster data output from the enhancement stage and device specific raster data output from the color conversion stage to a halftoning stage in the rasterization pipeline; and
   sending bi-tonal raster data output from the enhancement stage and sending printer swath data output from the halftoning stage to a marking engine;
   wherein the foregoing sending steps for steering the data through the rasterization pipeline are directed by the image object.

2. The method according to claim 1 wherein:
   the rasterization pipeline includes an image metadata processing stage and an image/raster processing stage, and
   the method further including, in the image metadata processing stage, inspecting the image/raster print data to find information associated with a job setting;
   receiving job or page settings at the individual rasterization pipeline stages, including the job setting identified in the image metadata processing stage, and rasterizing the raster formatted print data or image formatted print data according to the received job or page settings.

3. The method according to claim 2 including identifying the job or page settings in the image metadata processing stage of the multi-stage rasterization pipeline.

4. The method according to claim 1 including:
   separating the raster formatted print data or image formatted print data from print commands using a PJL interpreter or PDL interpreter and also receiving the raster formatted print data or image formatted print data externally from a host computer; and
   entering the raster formatted print data or image formatted print data at a selected entry point of the printing pipeline stages according to the level of rasterization of the print data.

5. The method according to claim 1 including centrally monitoring rasterization of the raster formatted print data or image formatted print data by the multiple different pipeline stages and then directing rasterized output from the multiple different printing pipeline stages to selected subsequent pipeline stages.

6. The method according to claim 1 including:
   providing decoding, rotation/resizing, image enhancement, color conversion and half-toning processing stages in the rasterization pipeline;
   arranging the pipeline for receiving the print data at a selected entry point among the decoding, rotation/resizing, image enhancement, color conversion and half-toning processing stages;
   receiving the image formatted print data at the decode stage of the printing pipeline and outputting raster formatted print data from the decode stage; and
   receiving the raster formatted print data at subsequent stages in the printing pipeline either from the decode stage, from a print job interpreter, or externally from a host system.

7. The method according to claim 1 including:
   providing decoding, rotation/resizing, image enhancement, color conversion and half-toning processing stages in the rasterization pipeline;
   arranging the pipeline for receiving the print data at a selected entry point among the decoding, rotation/resizing, image enhancement, color conversion and half toning processing stages in the rasterization pipeline;
   receiving the print data;
   among the received print data, separating image control data from the raster formatted print data or image formatted print data;
   recognizing a current rasterization state of the raster formatted print data or image formatted print data; and
   sending the raster formatted print data or image formatted print data to enter the printing pipeline at a next sequential one of the printing pipeline stages according to-the current rasterization processing state of the print data.

8. The method according to claim 7 including:
   identifying Page Description Language (PDL) formatted print data or Print Job Language (PJL) formatted print data;
   converting any PJL formatted print data into PDL formatted print data, raster formatted print data, or image formatted print data; and
   converting any PDL formatted print data into raster formatted print data or image formatted print data.

9. The method according to claim 1 including:
   providing decoding, rotation/resizing, image enhancement, color conversion and half-toning processing stages in the rasterization pipeline;
   arranging the pipeline for receiving the print data at a selected entry point among the decoding, rotation/resizing, image enhancement, color conversion and half-toning processing stages in the rasterization pipeline;
   receiving raster formatted print data at the color enhancement stage in the printing pipeline;
   outputting grayscale raster data from the color enhancement stage to the halftoning stage in the printing pipeline;
   outputting color raster data from the color enhancement stage to the color conversion stage in the printing pipeline; and
   outputting bi-tonal raster data from the color enhancement stage directly to a print engine.

10. A printing system, comprising:
    a controller operating a printing pipeline having multiple image rasterization stages and receiving print data rasterized at different levels, the controller entering the received print data into the printing pipeline at a next required rasterization stage while skipping some or all the rasterization stages in the pipeline that have already been completed on the received print data;
    wherein the controller generates an image object for monitoring and controlling the multiple-stage rasterization pipeline during processing of the received print data; and the image object selects the next required rasterization stage for sending the received print data into the pipeline while skipping some or all the rasterization stages in the pipeline that have already been completed on the received print data.

11. The printing system according to claim 10 wherein the controller conducts an image metadata process that determines job or page settings from raster or image formatted print data and uses the job or page settings in the different rasterization stages.

12. The printing system according to claim 10 including a PDL interpreter and a PJL interpreter; wherein the controller operates a top-level sniffer that sends received raster or image formatted print data to the printing pipeline, sends Page Description Language (PDL) formatted print data to the PDL interpreter for converting into raster or image formatted print data, and sends Print Job Language (PJL) formatted print data to the PJL interpreter for converting into raster or image formatted print data or for converting into PDL formatted print data that is then sent to the PDL interpreter for converting into raster or image formatted print data;

and further wherein the controller includes a image metadata process that receives the raster or image formatted print data from the sniffer, PJL interpreter, and PDL interpreter and then selectively directs the raster or image formatted print data into the various rasterization pipeline stages as appropriate based on the image metadata.

13. The printing system according to claim 12 wherein the controller receives job and page settings from the image metadata process, the PJL interpreter, the PDL interpreter, a control panel, or an embedded web page and uses the job and page settings for the different rasterization stages in the printing pipeline.

14. The printing system according to claim 10 wherein the controller operates a central image controller that directs the different rasterization stages where next in the printing pipeline to send processed print data.

15. A method for identifying print settings, comprising:
receiving raster or image print data;
identifying job or page settings from the raster or image print data;
using the identified job setting for image and raster processing;
identifying the job or page settings from an image metadata section of the image print data;
providing multiple rasterization pipeline stages for the image and raster processing;
sending image formatted print data to a decode stage of the rasterization pipeline; and
skipping the decode stage and sending raster formatted print data to a subsequent stage in the rasterization pipeline;
generating an image object for monitoring and controlling the multiple-stage rasterization pipeline during processing of the raster or image print data;
sending the raster formatted print data generated in the rasterization pipeline to a color enhancement stage in the rasterization pipeline;
sending color raster data output from the enhancement stage to a color conversion stage in the rasterization pipeline;
sending grayscale raster data output from the enhancement stage and device specific raster data output from the color conversion stage to a halftoning stage in the rasterization pipeline; and
sending bi-tonal raster data output from the enhancement stage and sending printer swath data output from the halftoning stage to a marking engine;
wherein the foregoing sending steps for steering the data through the rasterization pipeline are directed by the image object.

16. The method according to claim 15 wherein the image object monitors the status of each stage of the rasterization pipeline during processing of the raster or image print data; and directs movement of data in the pipeline by applying a tag to the data indicating to which stage the data is to be sent following completion of the current processing stage.

* * * * *